(12) United States Patent
Epars et al.

(10) Patent No.: US 9,370,272 B2
(45) Date of Patent: Jun. 21, 2016

(54) BEVERAGE PRODUCTION MACHINE COMPRISING FEATURES TO FACILITATE CAPSULE LOADING AND UNLOADING

(75) Inventors: Yann Epars, Penthalaz (CH); Vincent Martin, Crissier (CH); Heinz Wyss, Oberdiessbach (CH); Raphael Bernhardsgruetter, St-Gallen (CH); Lucio Scorrano, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 213 days.

(21) Appl. No.: 13/982,172

(22) PCT Filed: Jan. 24, 2012

(86) PCT No.: PCT/EP2012/051038
§ 371 (c)(1),
(2), (4) Date: Jul. 26, 2013

(87) PCT Pub. No.: WO2012/104173
PCT Pub. Date: Aug. 9, 2012

(65) Prior Publication Data
US 2013/0305932 A1 Nov. 21, 2013

(30) Foreign Application Priority Data

Jan. 31, 2011 (EP) .................................... 11152739

(51) Int. Cl.
*A47J 31/00* (2006.01)
*A47J 31/40* (2006.01)
(Continued)

(52) U.S. Cl.
CPC ............ *A47J 31/407* (2013.01); *A47J 31/0668* (2013.01); *A47J 31/369* (2013.01); *A47J 31/3614* (2013.01); *A47J 31/3633* (2013.01); *A47J 31/4467* (2013.01)

(58) Field of Classification Search
CPC ..................... A47J 31/3614; A47J 31/3633
USPC .............. 99/289 R, 295; 312/334.46, 334.45, 312/334.44
See application file for complete search history.

(56) References Cited

U.S. PATENT DOCUMENTS 1,969,749 A * 8/1934 Harsh .............................. 292/73
2,655,423 A * 10/1953 Strayer .................... 312/334.44
(Continued)

FOREIGN PATENT DOCUMENTS

CN 1774176 5/2006
DE 102007040307 2/2009
(Continued)

OTHER PUBLICATIONS

Chinese Office Action for Application No. 201280006954.2, dated May 25, 2015, 14 pages.
(Continued)

*Primary Examiner* — Reginald L Alexander
(74) *Attorney, Agent, or Firm* — K&L Gates LLP

(57) ABSTRACT

Production machine (1) for beverages and liquid comestibles, the machine comprising: a housing (20); a capsule holder designed for insertion into the housing (20), wherein the capsule holder comprises a capsule receiving means (11); a liquid injection assembly (4*a*, 4*b*) provided in the housing (20). The capsule holder and the machine are designed such that the capsule holder can be transferred manually, via a relative movement of the capsule holder and the housing of the machine, at least between: —a first capsule loaded position, in which any capsule (30) received in the capsule holder is positioned ready for being engaged by the liquid injection assembly (4*a*, 4*b*) and, —a second capsule loading position adapted for loading a capsule outside of the housing (20). Complementary stopping means of the capsule holder and the housing are provided which are configured to automatically engage each other to stop the capsule holder in the second capsule loading position. The capsule holder (10) can be resiliently removed completely from the housing (20) for cleaning/replacing purposes and in a way that it is not damaged or does not require tools.

13 Claims, 13 Drawing Sheets

(51) Int. Cl.
*A47J 31/36* (2006.01)
*A47J 31/06* (2006.01)
*A47J 31/44* (2006.01)

(56) References Cited

U.S. PATENT DOCUMENTS

| | | | | |
|---|---|---|---|---|
| 2,730,423 | A * | 1/1956 | Mock | 312/334.22 |
| 3,980,363 | A * | 9/1976 | Dean et al. | 312/294 |
| 6,510,783 | B1 * | 1/2003 | Basile et al. | 99/289 R |
| 6,843,165 | B2 * | 1/2005 | Stoner | 99/295 |
| 6,904,840 | B1 * | 6/2005 | Pfeifer et al. | 99/295 |
| 7,747,190 | B2 * | 6/2010 | Kimura et al. | 399/110 |
| 7,845,270 | B2 * | 12/2010 | Rahn et al. | 99/289 R |
| 2006/0150823 | A1 | 7/2006 | Thomas | |
| 2007/0221069 | A1 | 9/2007 | Rahn et al. | |

FOREIGN PATENT DOCUMENTS

| | | |
|---|---|---|
| DE | 202010012021 | 11/2010 |
| EP | 1967100 | 9/2008 |
| WO | WO2005060801 | 7/2005 |
| WO | 2012062842 | 5/2012 |

OTHER PUBLICATIONS

European Office Action for Application No. 12 700 576.7-1656, dated Oct. 8, 2015, 5 pages.

* cited by examiner

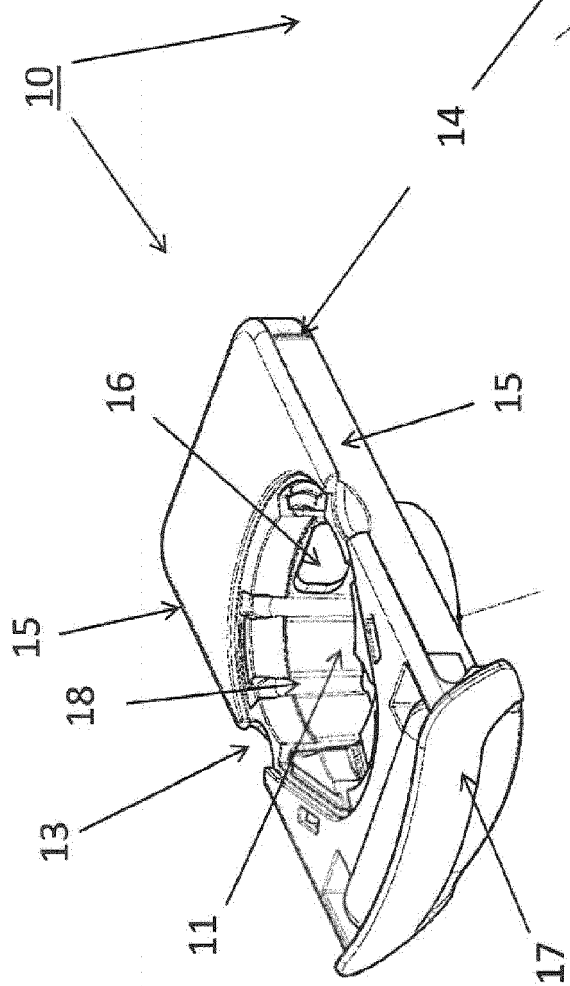
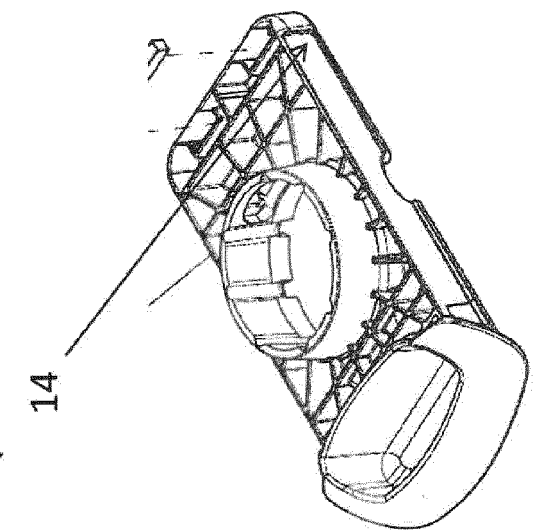

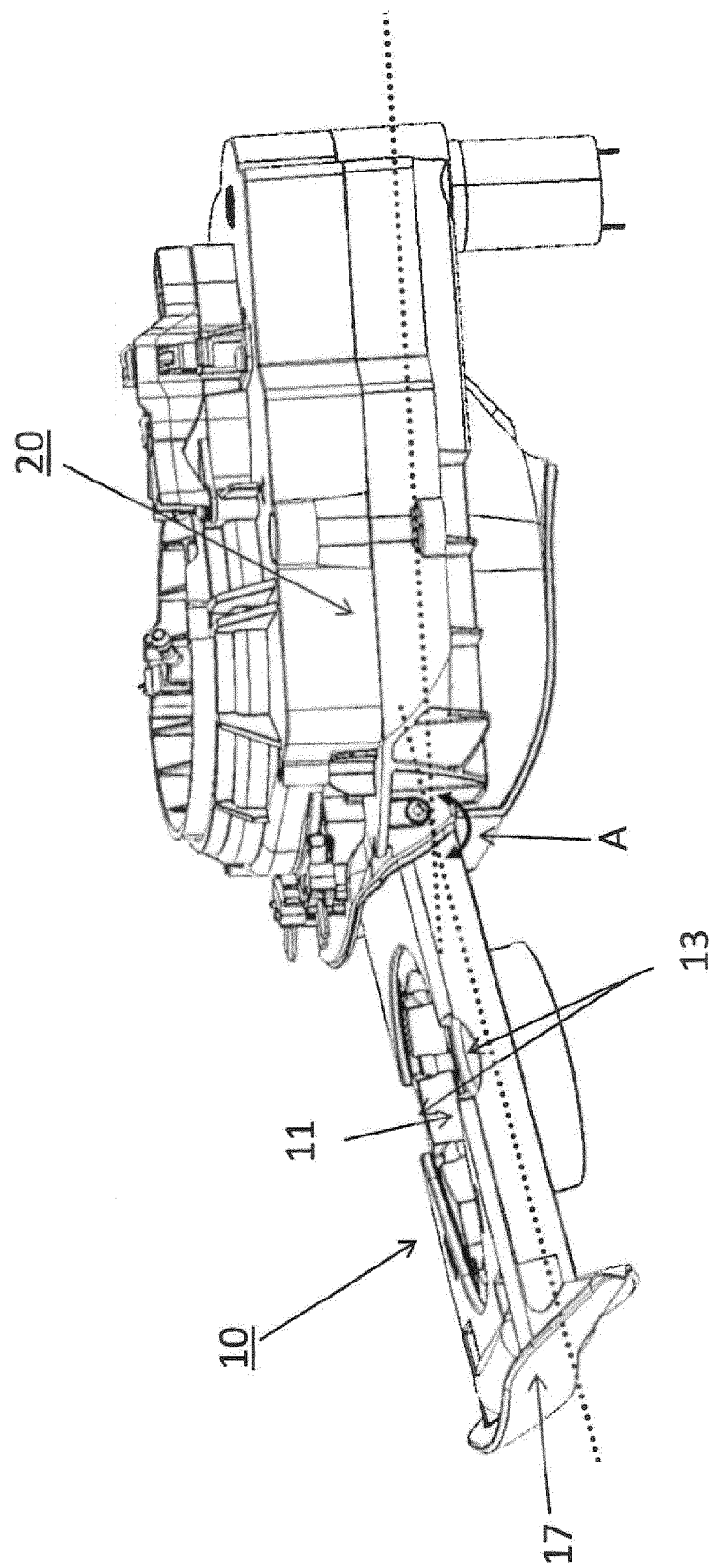

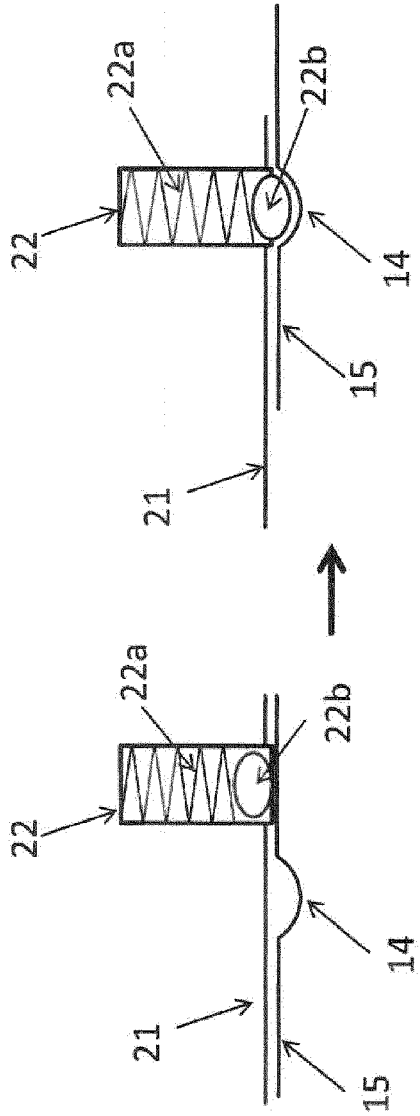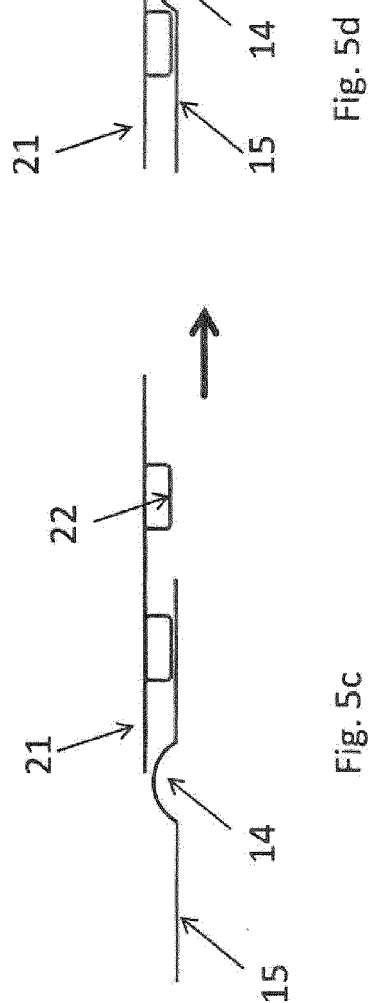

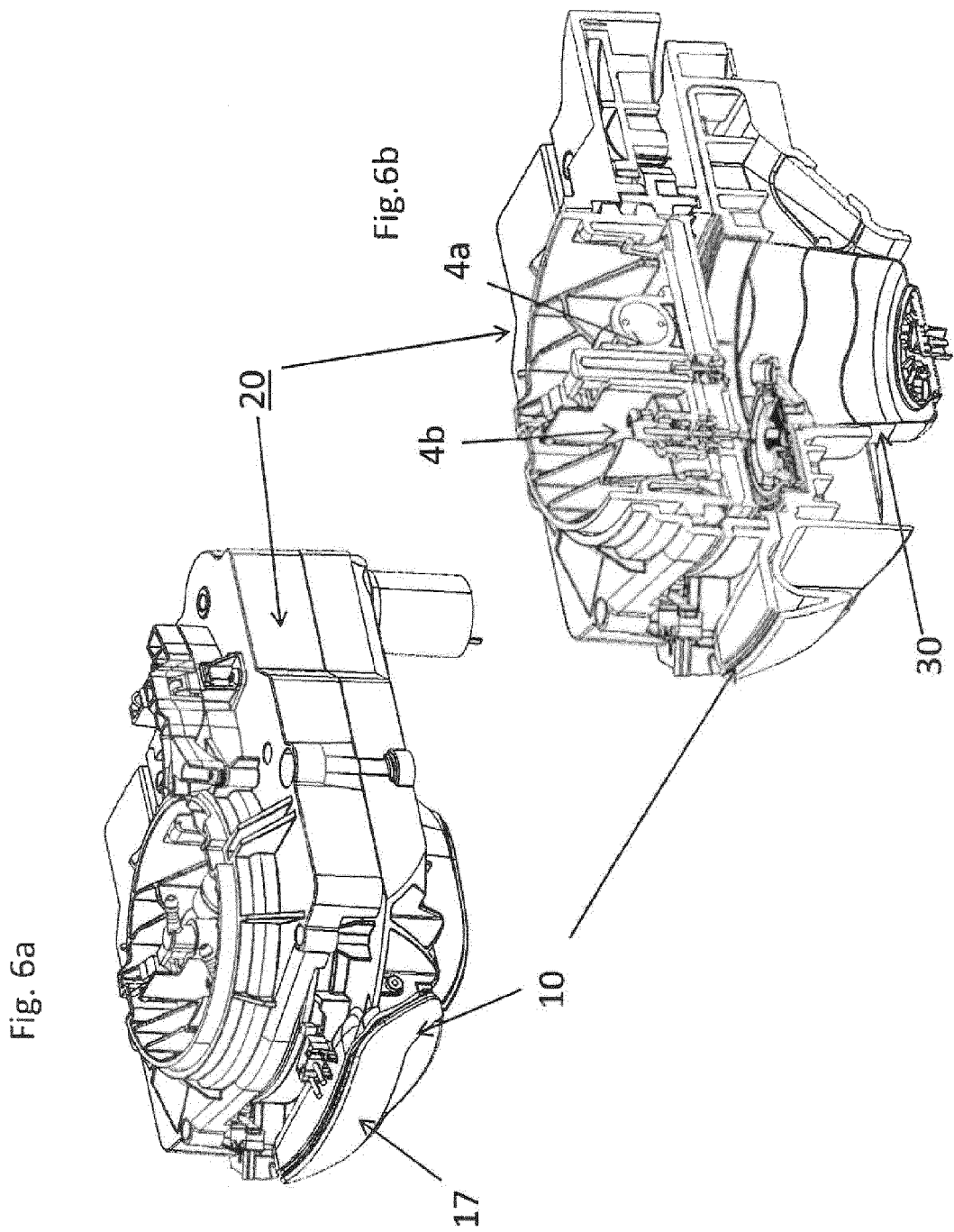

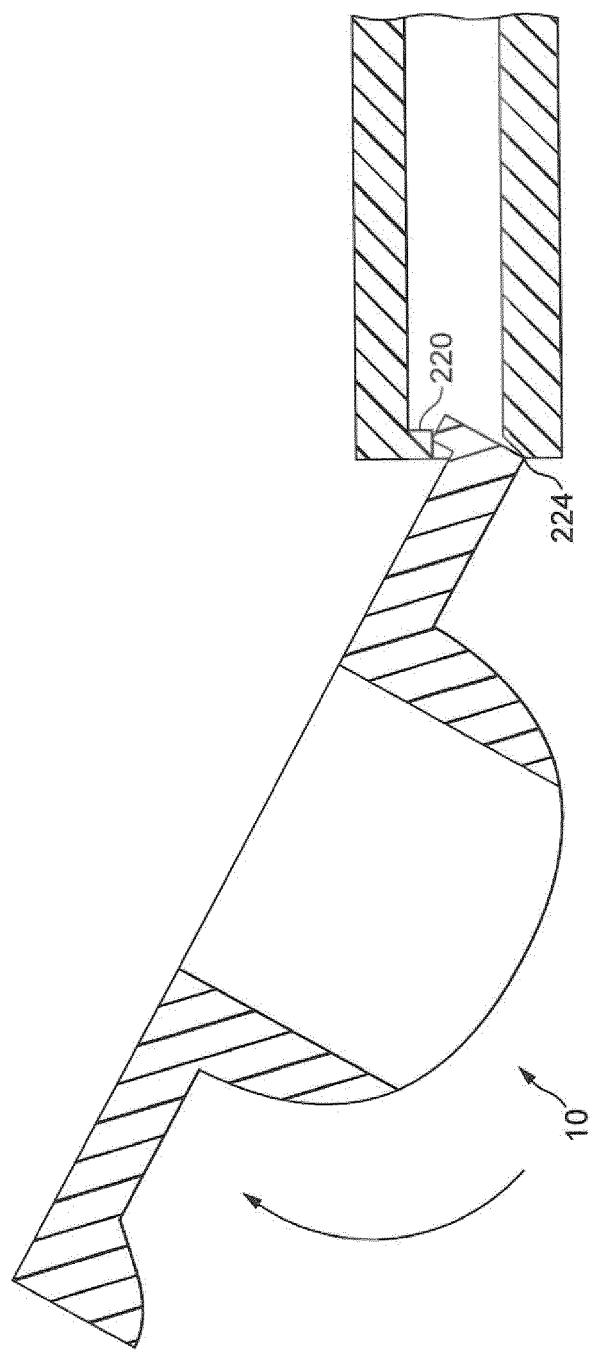

BEVERAGE PRODUCTION MACHINE COMPRISING FEATURES TO FACILITATE CAPSULE LOADING AND UNLOADING

CROSS REFERENCE TO RELATED APPLICATIONS

The present application is a National Stage of International Application No. PCT/EP2012/051038, filed on Jan. 24, 2012, which claims priority to European Patent Application No. 11152739.6, filed Jan. 31, 2011, the entire contents of which are being incorporated herein by reference.

The present invention relates to a beverage production machine and a capsule holder for facilitated handling. In particular, the beverage production machine may be designed for the preparation of beverages, liquid comestibles, etc. by using a capsule containing ingredients in combination with a supplied liquid. The invention relates to a beverage production machine comprising a capsule holder, which can be more easily operated for loading or removing a capsule with a one-hand operation by a user.

A beverage or liquid comestible can be prepared by inserting a capsule containing ingredients like coffee, tea, soup, juice, or nutritional products, such as infant formula, into a beverage production machine, and by supplying a liquid, such as water, milk, soup or the like, to the capsule through the beverage production machine. The ingredients in the capsule are made to interact with the liquid in order to obtain the desired beverage. Typically, the capsule is held in a defined position by a capsule holder of the beverage production machine. The capsule is perforated by elements of the machine or of the capsule itself, and then liquid is injected into the capsule to mix with the ingredient. In the context of the invention, the term "capsule" refers to any rigid or semi-rigid container containing beverage ingredients. Other synonymous to a capsule are: "pod", "pad" or "cartridge". The capsule can be single use. The capsule can also be filled with ingredient by the user to form the capsule just before use. The capsule can be formed of different separable pieces before insertion in the beverage production machine.

Beverage production devices using a capsule holder for inserting a capsule into a beverage production machine exist in the state of art. For example, EP1486150 relates to a beverage dispensing machine comprising a slide assembly including a cartridge holder moveable from a loading position to a loaded position. However, the cartridge holder cannot be easily removed from the machine and requires manipulating tools.

For example, the documents EP1967100, EP1967099, and WO2009/077488 each disclose a solution, wherein a capsule holder is fully removable from a beverage production machine by means of guiding rails, which are provided to a housing of the beverage production machine. However, for the insertion of a capsule into the capsule holder, the capsule holder must be fully removed; the user must handle the capsule holder with one hand, and must place a capsule into the capsule holder with the other hand. This operation is not very convenient for the user.

Therefore, it is an object of the present invention to reduce the above disadvantages, and in particular to provide a way to operate the capsule holder during reloading of a capsule with only one hand. A further requirement is that the capsule holder should be easy to remove from the beverage production machine for cleaning purposes, and it must be easy to insert the capsule holder back into the beverage production machine. The need for periodic cleaning of the capsule holder is particularly critical in relation to ingredients, which are particular sensitive to microbial contamination and/or growth, such as infant formula. Therefore, it is a further object of the present invention to make the beverage production machine and the capsule holder easier to clean.

None of the above mentioned documents provides a satisfactory solution to the mentioned objects. The objective problems are, however, solved by the independent claims of the present invention. The dependent claims develop further advantages of the solution.

The invention thus proposes a production machine for beverages and liquid comestibles, the machine comprising:
- a housing;
- a capsule holder designed for insertion into the housing, wherein the capsule holder comprises a capsule receiving means designed for receiving a capsule containing ingredients suitable for the preparation of a beverage;
- a liquid injection assembly provided in the housing for supplying liquid to the capsule received in the capsule holder;
- wherein the capsule holder and the machine are designed such that the capsule holder can be transferred manually, via a relative movement of the capsule holder and the housing of the machine, at least between:
- a first capsule loaded position, in which a capsule received in the capsule holder is positioned ready for being engaged by the liquid injection assembly,
- a second capsule loading position, in which the capsule receiving means are exposed outside of the housing for the loading of a capsule therein,
- wherein complementary stopping means of the capsule holder and the housing are provided which are configured to automatically engage each other to stop the capsule holder in the second capsule loading position as it is moved from its first capsule loaded position,
- wherein such stopping means are further configured to be released by moving the capsule holder manually in at least one direction causing the capsule holder to be removed from the housing.

In a first mode, the stopping means are configured to be released by applying a pulling force. Preferably the force is oriented in a substantially linear direction.

The stopping means may also be designed to confer a tactile feedback to the user's hand when transferring the capsule holder from the second to the first and/or removal configuration.

Preferably, the stopping means are configured to provide a resilient engagement of the capsule holder in the housing. This resilient engagement participates to the convenient and easy handling of the capsule holder when moved from one position to another.

Preferably, in the second capsule loading position a pulling force above a predetermined threshold is required to remove the capsule holder from the housing. By virtue of the stopping means, the capsule holder is held stably in the second defined loading position. However, it is possible for a user of the beverage production machine to release the stopping means when removing the capsule holder from the second stable defined capsule loading position towards the first loaded position and/or removal configuration with a reasonable release force, i.e. a force which can be easily applied with one hand. More preferably, the release force is comprised between 4 and 25 Newton, preferably about 15 Newton.

Preferably, the capsule holder and housing are configured with complementary sliding means to ensure the sliding of the capsule holder between the different positions upon a force exerted by the user which is set below the force threshold necessary to obtain the release of the stopping means in the second capsule loading position. For this, the housing comprises parallel guiding rails for guiding the capsule holder into the housing by receiving opposite lateral edges of the capsule holder. The guiding rails ensure that the capsule holder is inserted correctly into the beverage production machine, and that the capsule can be positioned correctly for liquid supply. The guiding rails can also be not parallel, as long as they guide the capsule holder in the different positions. The force to move the capsule holder along the guiding rails should be lower than the force necessary to release the stopping means in the second defined stable position.

Preferably, in the second position, the lateral edges of the capsule holder are slanted relative to the guiding rails, preferably by an angle in a range of 150 to 175°. This means the capsule holder is inclined in respect to its insertion direction in the capsule loading position, so that the upper surface of the capsule holder, which comprises the recess for the capsule, is turned slightly towards the user. Two effects are therewith achieved. Firstly, the user can easily recognize that the stable loading position is reached. Secondly, the slanted position facilitates the loading of a capsule, because the capsule receiving means is better visible from the user's position, and is easier to access for the user, particularly in a one-hand operation.

In a second mode, the stopping means are configured to be released by applying a movement on the capsule holder consisting essentially of an upward rocking movement, e.g., about the complementary stopping means. In particular, the stopping means of the capsule holder form in engagement with the stopping means of the housing, a free pivot that forces the capsule holder to be pivoted upwards for enabling the disengagement of the capsule holder from the housing.

In general, the complementary stopping means comprises stopping members provided on each of the guiding rails of the housing, and engaging members provided on each of the lateral edges of the capsule holder; wherein the engaging members are adapted to engage with the stopping members to define the second stable defined loading position of the capsule holder in the housing. The engaging members and the stopping members allow to place the capsule holder in the stable second defined loading position, so that a capsule can be reloaded in a one-hand operation. The stopping members and/or engaging members that hold the capsule holder in the stable second loading position are preferably resilient, that means are not rigid, in order to allow repeated uses without damage or less wearing of the capsule holder or beverage production machine.

In the first mode, the stopping members are ball plungers or rubber retainers, and the engaging members are transversal protrusions or recesses. Alternatively the above configuration can be inverted, so that the stopping members are placed onto the lateral edges of the capsule holder, and the engaging members are placed onto the guiding rails. The engaging members and stopping members, respectively, provide an easy and cheap solution for putting the capsule holder in the stable second defined loading position. The stopping members can be easily exchanged, particularly if they are screwed to the guiding rail. However, they can also be glued or riveted to the guiding rail, or can be formed integrally with the guiding rails. The ball plungers or rubber retainers are preferably the same on each guiding rail, but are not necessarily restricted thereto.

Preferably, the ball plungers have a substantially cylindrical shape, and have an axial cavity, into which a spring and a ball are inserted, wherein the balls are adapted to exit the axial cavity on one side of the ball plunger partially, and wherein the recesses are formed according to the shape of the balls. The capsule holder will be held stably in the second defined loading position, but will exhibit resiliency due to the elasticity of the springs. The balls will be automatically pushed against the lateral edges of the capsule holder, when the capsule holder is moved from the second stable defined loading position. Thus, the balls provide a cushion between guiding rails and lateral capsule holder edges, reducing the wear out of those pieces. Preferably, the balls are made of a smooth material such as metal (e.g. stainless steel). However, also a rubber or plastic material, which is softer than the lateral edge of the capsule holder to avoid scratching, is possible.

In the second mode, the stopping members are a pair of transversally and upwardly raising indentations on the front of the capsule holder; and the engaging members are a pair of transversally and downwardly raising indentations at the entry of the housing.

More generally, a ramp is provided on each of the guiding rails, wherein the ramp is bordering the stopping members to the inside of the housing, for providing a frictional engagement with the engaging members of the capsule holder in the second stable defined loading position. Thus, the capsule holder can be better stabilized in the second stable defined loading position, due to the frictional force, which acts on the protrusions on the lateral edges of the capsule holder through the ramp.

Preferably, the capsule holder comprises a pair of notches, wherein the notches border the upper edge of the recess, preferably on opposite sides of the recess. The notches serve to facilitate the removal of capsules from the recess in the capsule holder. The notches should be laid out large enough, that the user can at least partially insert a finger into each of the notches, however, the shape of the notches can be arbitrary.

Preferably, the contour of the upper edge of the recess is not symmetric in rotation. The non-symmetric contour prevents an incorrect insertion of the capsule into the capsule holder. This is necessary, if the capsule has prominent features, like a filter unit or an optically readable code, which is to be read by the beverage production machine, and if these prominent features have to take a fixed predetermined position inside the beverage production machine for proper functionality.

Preferably, the capsule holder comprises an aperture on the front side wall of the recess, wherein the front side wall is defined in respect to the insertion direction of the capsule holder. If the capsule is provided with an optically readable code, then the aperture allows a code reader in the beverage production machine to illuminate and read out the optically readable code. Naturally the optically readable code and the aperture have to be aligned, when the capsule sits in the recess of the capsule holder.

Preferably, the capsule holder comprises a handle on its rear edge, wherein the rear edge is defined in respect to the insertion direction of the capsule holder. By means of the handle, the capsule holder can be easily inserted and pulled out of the housing of the beverage production machine.

Preferably, the handle abuts with the housing in the first stable loaded position. Therefore, it is at least impossible to move the capsule holder further into the housing, thus stabilizing the position. The handle can be also provided with means to provide a resisting force, when the capsule holder is to be pulled out of the housing, thus stabilizing the loaded position further.

In summary, the present invention provides solutions for a beverage production machine and a capsule holder, wherein the capsule holder can be reloaded with a new capsule in a one-hand operation by the user. At the same time the capsule holder can be easily removed from the beverage production machine, so that both the beverage production machine and the capsule holder can be easily cleaned. When removing the capsule holder, it will not be damaged, and can be easily inserted back into the beverage production machine.

In the following, a detailed description of the present invention with reference to the attached drawings will be given.

FIGS. 3a and 3b show a capsule holder according to a first mode of the present invention in a view from above and up-side-down, respectively.

FIG. 4 shows the capsule holder in a position in the beverage production machine according to the present invention, in which it can be refilled.

FIGS. 5a to 5h show examples of how the complementary stopping means, in particular, the engaging members of the capsule holder and the stopping members of the beverage production machine may engage.

FIGS. 6a and 6b show the capsule holder in a position in the beverage production machine according to the present invention, in which a capsule is positioned for liquid supply.

Figure 8A:
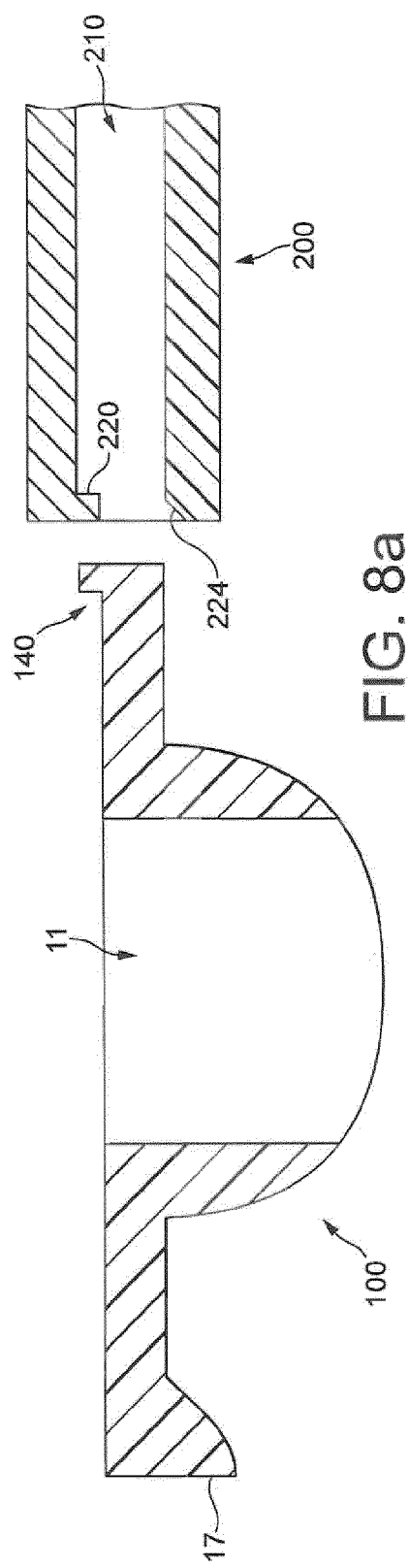
Figure 8B:
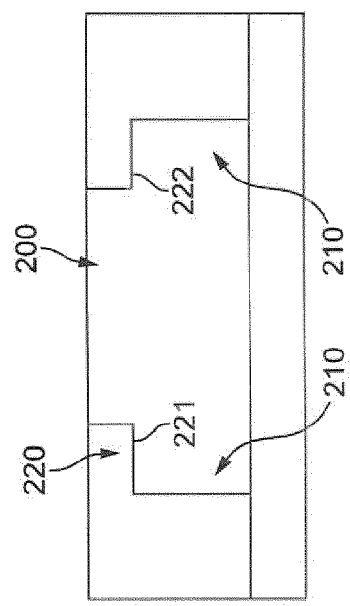
Figure 8C:
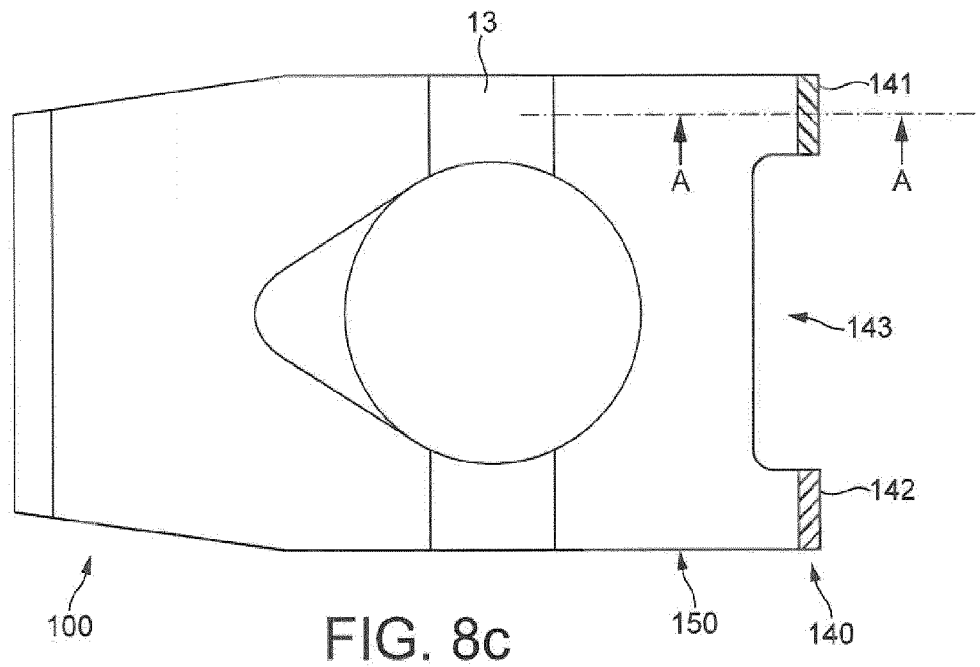
Figure 8D:
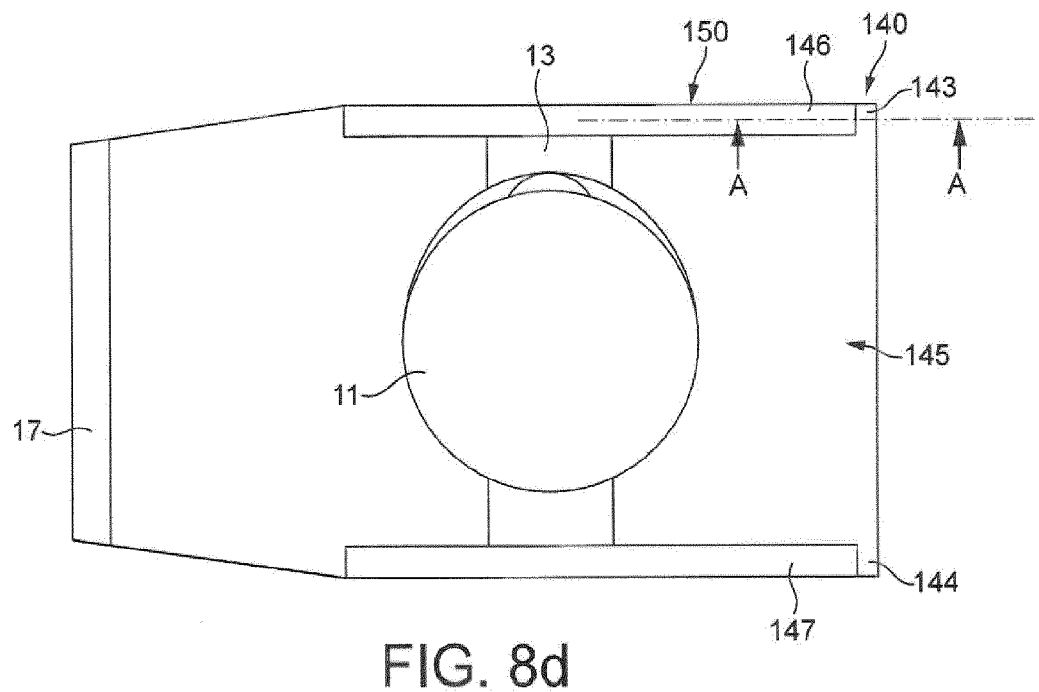
Figure 8E:
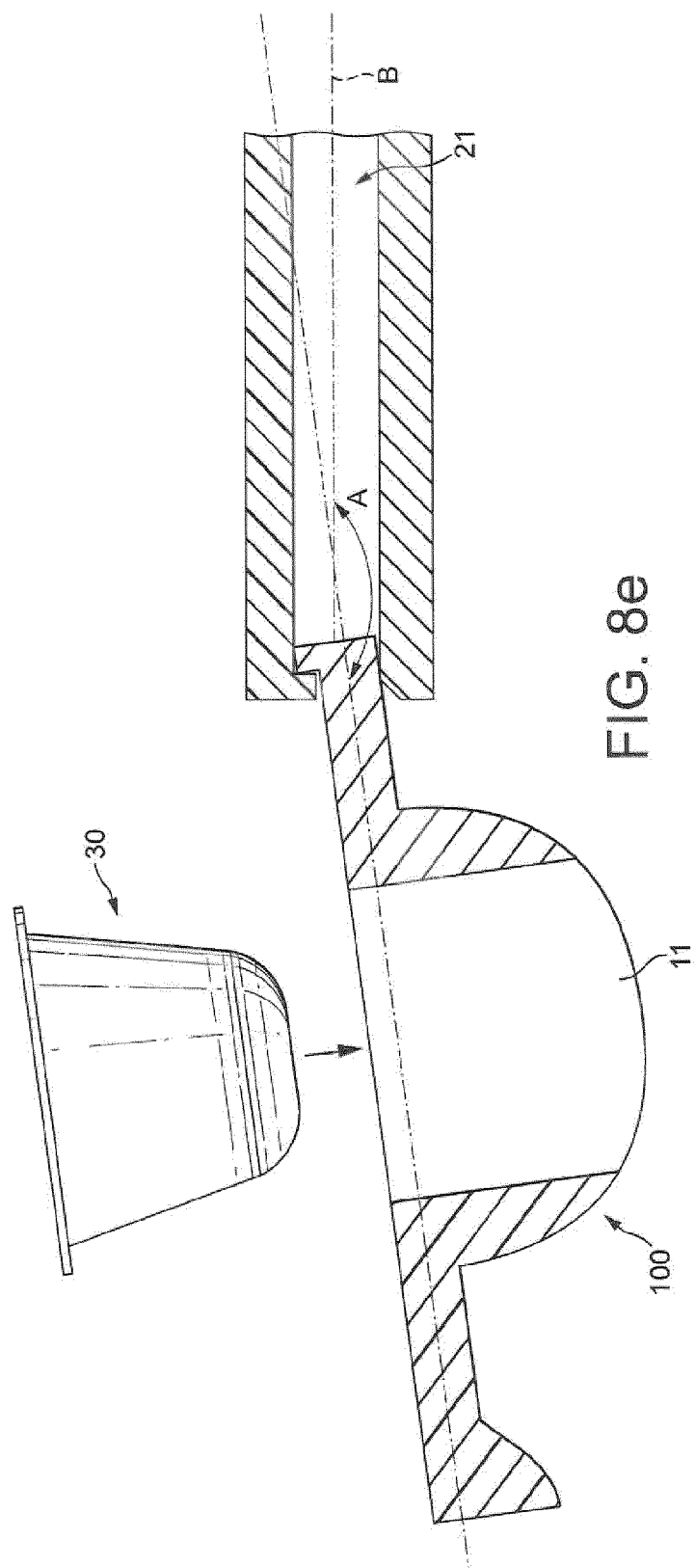
Figure 8F:
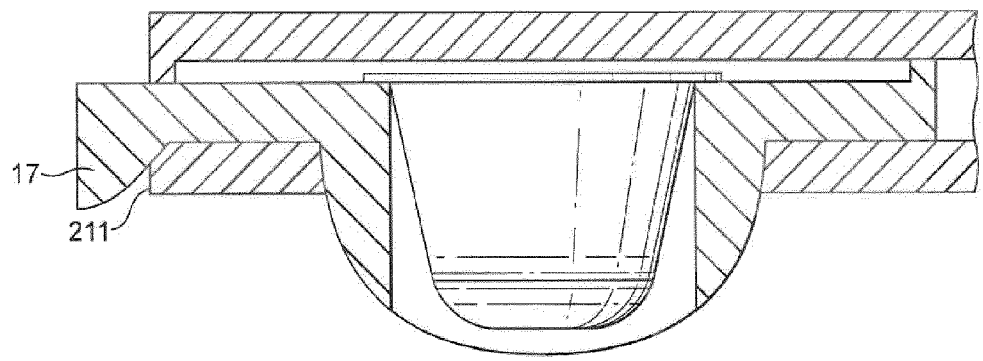

FIG. 8a to FIG. 8g show a second mode of the invention, in particular, FIG. 8a, shows in longitudinal cross section (along plane A-A of FIG. 8c or 8d) a capsule holder removed from the capsule holder; FIG. 8b shows in front plane view the housing of the machine; FIG. 8c shows in top plane view a first embodiment of the capsule holder; FIG. 8d shows in top plane view a second embodiment of the capsule holder; FIG. 8e shows in longitudinal cross section, the capsule holder in the capsule loading position; FIG. 8f shows in longitudinal cross section, the capsule holder in the beverage production position in the housing of the machine; FIG. 8g shows the capsule holder being disengaged from the housing.

Figure 1:
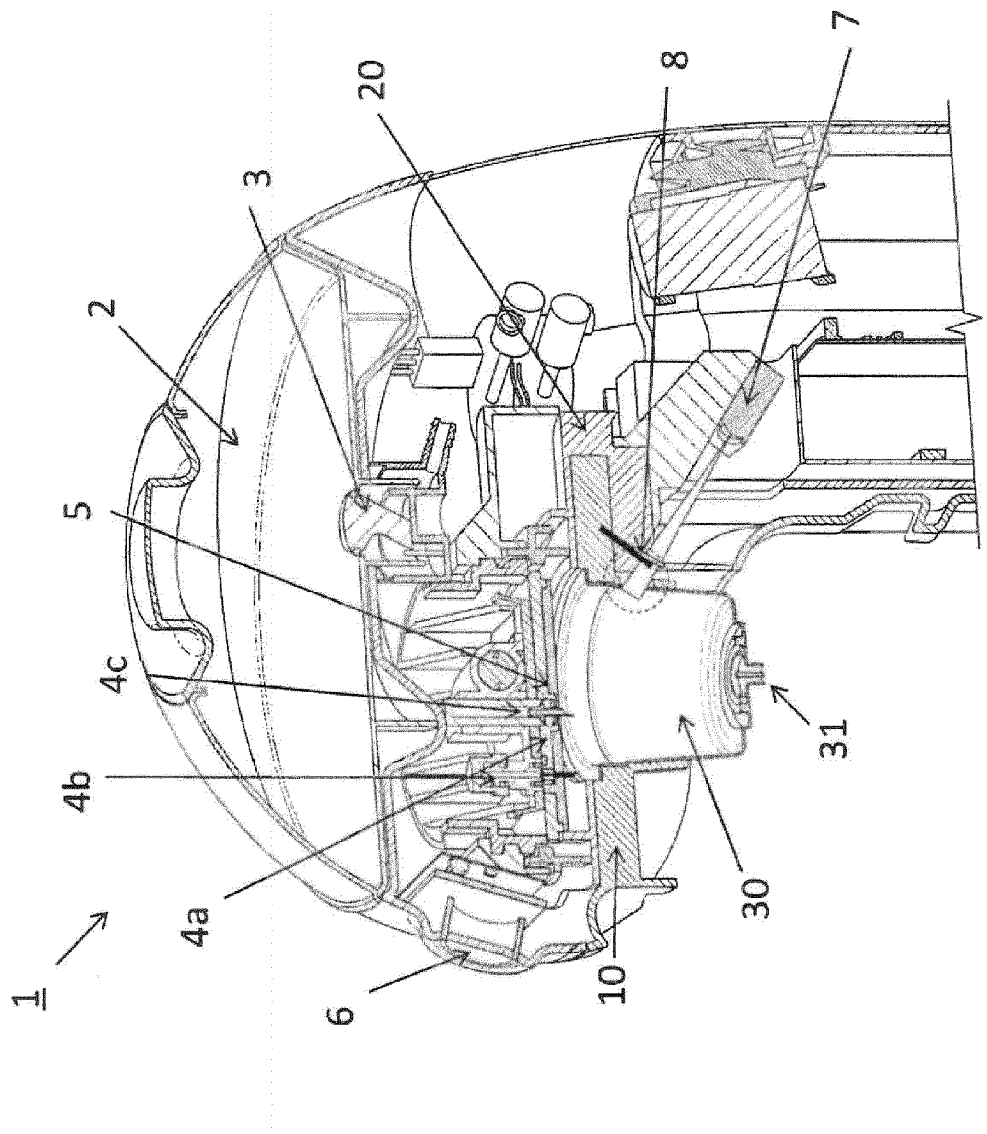
FIG. 1 shows a detailed cross-section of a head portion of a beverage production machine according to the present invention

FIG. 1 shows a cross-section through a head portion of a beverage production machine 1 according to the present invention (i.e. the upper part of the machine without the base part, which typically comprises a drip tray or support for a cup, glass or the like). The beverage production machine 1 comprises a housing 20, into which a capsule holder 10 can be inserted. The capsule holder 10 can be inserted preferably in a sliding arrangement. The housing 20 is therefore equipped with guiding rails 21 (shown in FIG. 2 and explained in more detail below) for guiding the capsule holder 10 in a sliding relationship into the housing 20. The capsule holder 10 is adapted to hold a capsule 30. Further details regarding the capsule holder 10 according to the present invention will be provided below.

Attachable to the housing 20, as shown in the upper part of FIG. 1, is a reservoir 2, which holds liquid to be supplied to the capsule 30, in order to prepare the beverage. The liquid in the reservoir 2 can be any liquid like water, soup, milk or the like. Also multiple, different liquids could be held in sub-reservoirs or compartments in the reservoir 2. The reservoir 2 communicates with the housing 20 via a valve 3. The valve 3 is preferably designed to automatically open when the reservoir 2 is attached to the housing 20, and is designed to automatically close, if the reservoir 2 is removed from the housing 20. The reservoir 2 is constructed removable to the housing 20 to simplify its refilling or cleaning. The beverage production machine 1 further comprises means to heat the liquid in the reservoir 2, or to heat the liquid from the reservoir 2 in a separate chamber. The machine provides preferably liquid temperatures in a range of 23° C. to 40° C., however also other ranges for other purposes can be envisaged.

Inside the housing 20 is arranged a liquid injection assembly 4a, 4b, which comprises an injection plate 4a, a liquid needle 4b and optionally a gas needle 4c. The injection plate 4a is adapted to be either in an open position or in a closed position. The liquid needle 4b follows the movement of the injection plate 4a. When the injection plate 4a is closed, when the beverage production machine 1 is operated, the liquid needle 4b is pushed through an opening 5 of the housing 20 and penetrates the capsule 30 held in the capsule holder 10 from above.

Then, liquid from the reservoir 2 can be injected through the liquid needle 4b into the capsule 30. When the injection plate 4a is closed, a liquid tight enclosure is obtained between the housing 20 and the capsule 30, since the liquid plate 4a presses liquid tight onto an upper flange 36 of the capsule 30. Therefore, liquid is prevented from circulating down on the outside surface of the capsule 30, and the beverage production machine 1 and the capsule holder 10 are easier to clean.

When the injection plate 4a is opened, the liquid needle 4b is retracted through the opening 5 following the movement of the injection plate 4a. Any residual liquid, which might drip from the liquid needle 4b, is collected and drained through drain channels 18 (see FIG. 4a) provided on the capsule holder 10. The drain channels 18 serve to guide the liquid off the machine 1. Therefore, liquid contamination of the housing 20 can be reduced, and the machine 1 is easier to clean. The injection plate 4a can be opened and closed automatically by any suitable mechanism, either mechanically or electrically. The beverage production machine 1 optionally comprises one or more pumps to feed the liquid from the reservoir 2 or from a heating chamber to the liquid injection assembly 4a, 4b.

A code reader 7 can be placed in the beverage production machine 10 outside of the housing 20, for example on a frame, which is basically the part of the beverage production machine 1, which connects the head portion and the (not shown) base part. Such a code reader 7 typically comprises one or more light emitting diodes to illuminate an optically readable code on a capsule 30. When an optically readable code is detected, preparation parameters such as the volume of used liquid, the liquid temperature, or other possible parameter (e.g., the liquid pressure, flow rates, etc.), which depend on the capsule type, could be automatically set by the beverage production machine 1. To allow light to enter, the housing 20 may comprise a window 8. The window 8 prevents the code reader 7 from being contaminated by liquids seeping out from the housing 20. When the capsule holder is fully inserted, the walls of the capsule holder 10 will be interposed between the liquid injection plate 4a and the window 8. Thus, it is virtually impossible for liquid to drip or spurt onto the window 8, when the injection plate 4a is closed. Thus, the beverage production machine 1 is easier to clean.

A user interface 6 can be provided, for example, on the front of the beverage production machine 1, and can be adapted to be operated by a user, in order to activate the machine 1 and/or to adjust the liquid temperature and/or set preparation parameters for a desired beverage. For example, the adjustment of the liquid temperature (incremental or continuous) can be obtained by a touch screen or a rotary knob, and the start function can be obtained by a press button or by a touch screen. A function to manually set preparation parameters such as the volume of used liquid, the liquid temperature, or other possible parameter (e.g., the liquid pressure, flow rates, etc.), which depend on the capsule type could be provided.

Figure 2:
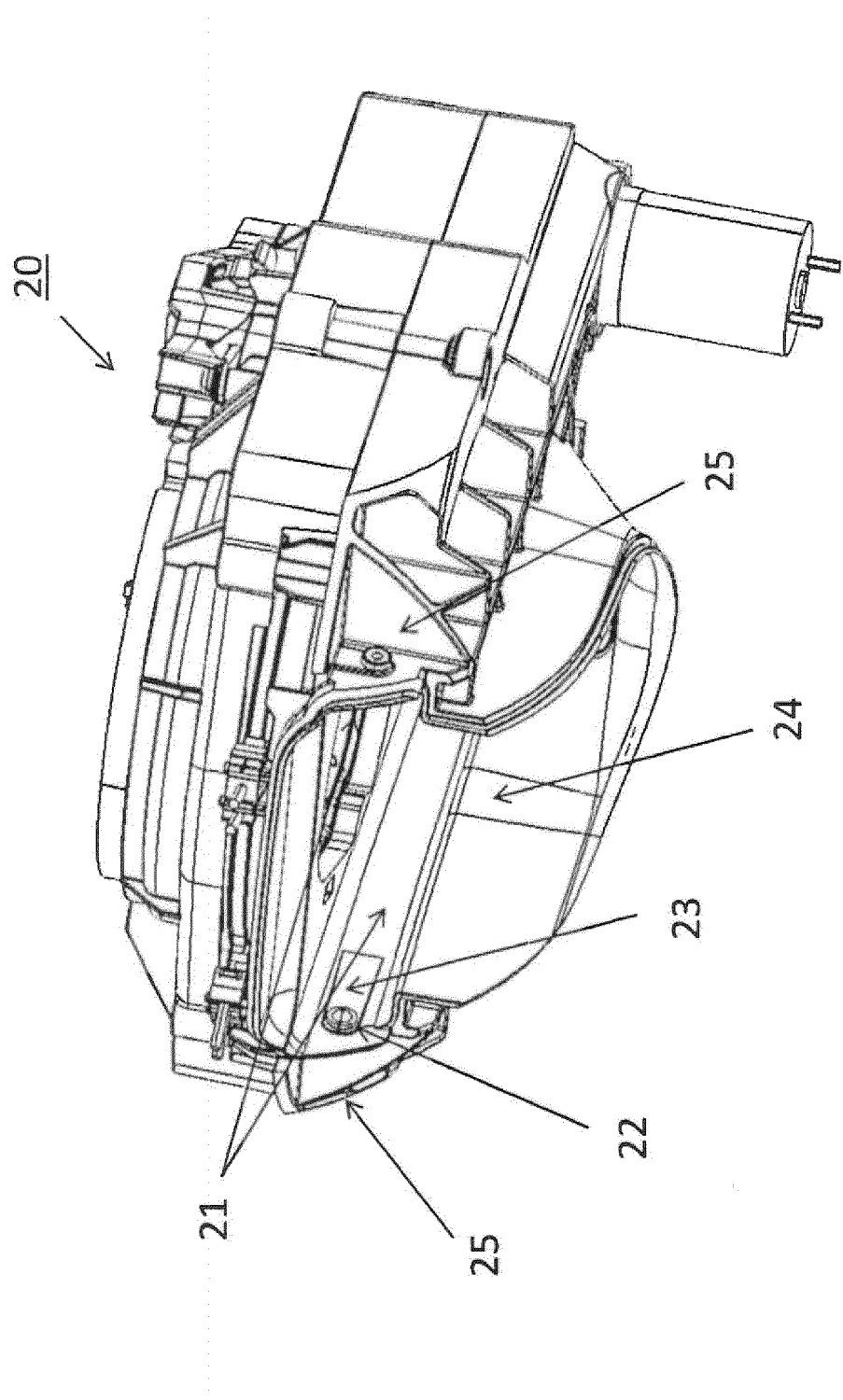
FIG. 2 shows a housing of a beverage production machine for receiving a capsule holder according to the present invention.

FIG. 2 shows the housing 20 with an opening 24 of the beverage production machine 1, into which the capsule holder 10 can be inserted. The opening 24 is mainly defined by left and right inner walls 25, is open to the bottom side, and is covered by the liquid injection assembly 4a, 4b on its top side. On the left and right walls 25 of the opening 24 are provided the guiding rails 21, which serve to guide the capsule holder 10 into the housing 20. The guiding rails 21 are preferably parallel to follow the preferred shape of the capsule holder 10. The guiding rails 21 can be attached to the housing 20 by any suitable means, or can be formed integrally with the housing 20.

FIGS. 3a and 3b show the capsule holder 10, wherein FIG. 3a shows a view from above, and FIG. 3b shows a view from below. The capsule holder 10 comprises two parallel lateral edges 15, which can be received by the guiding rails 21, in order to guide the capsule holder 10 in a sliding manner. FIG. 4 shows the capsule holder 10 partially inserted into the housing 20, but more explanation about FIG. 4 will be given below. The capsule holder 10 does not necessarily have to have parallel lateral edges 15. However, it is important that the capsule holder 10 matches the guiding rails 21, so that an easy and well defined insertion and removal of the capsule holder 10 into and from the beverage production machine 1 can be carried out.

Returning to FIG. 2, the guiding rails 21 on both sides of the opening 24 are provided with stopping members 22, which are preferably ball plungers or rubber retainers. The way how the ball plungers and rubber retainers 22 can particularly be formed is shown in FIGS. 5a to 5d. A ball plunger 22 is basically a device, which comprises a body having preferably a cylindrical shape, with the outer surface of the body provided with external threads formed thereon, in order to insert and/or screw the ball plunger 22 into a threaded bore. In this case at least one ball plunger 22 would be inserted into bores in the guiding rails 21. The ball plungers 22 are inserted into the guiding rail 21 with one of their ends, and the other ends are preferably left protruding from the guiding rails 21. The ends of the ball plungers 22, which protrude from the guiding rails 21 have an axial cavity, into which a ball 22b is inserted. Beneath the ball 22b preferably a spring 22a is located, and the insertion of the ball 22b into the cavity compresses the spring 22a. The ball 22b and the spring 22a are secured in place by rolling or crimping the edge of the axial cavity. If pressure is exerted onto the ball 22b, it will move to the inside of the cavity, further compressing the spring 22a. The spring force will reverse the movement of the ball 22b, as soon as the pressure is released. A rubber retainer 22 is preferably a flexible piece of rubber, which can be resiliently compressed. Preferably, the rubber retainer has a doughnut-like shape, i.e. a ring like outer wall enclosing an aperture. The outer wall can be rectangular, slanted or curved, if viewed in cross-section.

The capsule holder shown in FIG. 3a has engaging means 14 provided on each of its lateral edges 15, wherein the engaging members 14 preferably are protrusions and/or recesses. A recess can cooperate well with a ball plunger 22, in particular, when the shape of the recess 14 matches the outer shape of the ball 22b, i.e. the recess is a round semi-spherical hole. When the capsule holder 10 is moved in the housing 20, the lateral edges 15 of the capsule holder 10 press onto the ball 22b of the ball plunger 22, so that the capsule holder 10 can slide with its lateral edges 15 along the guiding rails 21. When the recesses 14 of the capsule holder 10 come to be aligned with the ball plungers 22, the spring force will move the ball 22b into the recesses 14, and will thereby create a stable defined position of the capsule holder 10 in the housing 20. Any further movement of the capsule holder 10, e.g. sliding the capsule holder 10 in either direction to the inside or the outside of the housing 20, will require at least overcoming the spring force of the ball plunger 22. A stable defined position is considered to be a position, in which the capsule holder 10 will not slide along the guiding rails 21 without any sufficient force to overcome a certain resisting force, like e.g. the spring force of the ball plungers 22. A sufficient force is preferably many times larger than the force required to move the capsule holder 10 from a non-stable position, which is mainly defined by frictional forces.

If the engaging members 14 are protrusions, then preferably the stopping means 22 are rubber retainers, so that the protrusions fit into the aperture of the rubber retainers. Then the capsule holder 10 is held in a stable defined position, which can be overcome by a force large enough to bend the side walls of the rubber retainer to remove the protrusions from the aperture. Also an inverted structure is possible, where stopping members 22 and engaging members 14 are exchanged. Protrusions or recesses would be provided on the guiding rails 21. Ball plungers or rubber retainers would be provided on the lateral edges 15 of the capsule holder 10.

The invention therefore proposes a capsule holder which can be manually displaced, relative to the housing of the production machine and preferably by a linear movement, between a first production position and a second capsule loading position. When the manual displacement reaches the second position, engagement means provided at the capsule holder and the machine come into effect, which engagement is designed to give a tactile feedback (stopping force) to the user's hand. This feedback force thus conveys the information to the user's hand that the capsule holder ha safely reached the second capsule loading position.

Figure 5E:
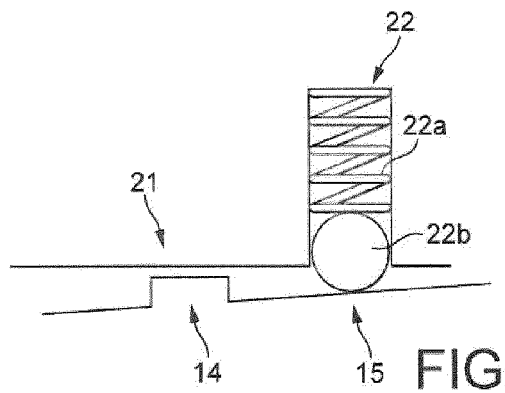

FIGS. 5a to 5h illustrate, in different modes, how the engaging members 14 of the capsule holder 10 engage with the stopping members 22 provided on the guiding rails 21, in order to bring the capsule holder 10 into the stable defined position, in which it partially engages with the housing 20. FIGS. 5a and 5b show the example of ball plungers 22 engaging with recesses 14, and FIGS. 5c and 5d show rubber retainers 22 engage with protrusions 14. These, however, are merely the two most preferred examples, but also other combinations of stopping members 22 and engaging members 14 can be employed.

In FIG. 5a the capsule holder 10 is not in a stable position, and can slide in to or out of the housing 20. The lateral edge 15 of the capsule holder 10 pushes the ball 22b into the axial cavity of the ball plunger 22, thereby exerting a force on the spring 22a. The spring 22a is thus compressed. The lateral edge 15 and the guiding rail 21 nearly touch, or do actually touch, if the ball plunger 22 is inserted fully into the guiding rail 21. If the ball plunger 22 protrudes slightly from the guiding rail 21, the lateral edge of the capsule holder 10 only touches the ball plunger 22, so that the guiding rail 21 is cushioned and protected from erosion. If the ball plunger is of a smooth material, the lateral edge 15 of the capsule holder 10 will take no damage, even if used very often (i.e. removed and inserted often). Preferably the ball plunger is made of smooth metal (e.g., steel) or plastic (e.g. Teflon). In FIG. 5b the capsule holder 10 has been moved (arrow) to a position, in which the ball plunger 22 and the recess 14 are aligned. The spring force pushes the ball 22b out of the axial cavity of the ball plunger 22, so that it comes to be enclosed by the recess 14. Now a force greater than a predetermined threshold is required to move the capsule holder 10 any further in or out of the housing (left and right in FIG. 5b). The threshold should be many times higher than a force required to overcome the frictional forces acting on the capsule holder 10 and the guiding rails 21 in a non-stable position. Thus, the position of the capsule holder 10 in the housing 20 is stable. Due to the spring, however, the means defining the position are resilient, and the capsule holder 10 is held flexibly.

A similar effect is achieved with an elastic and resilient rubber retainer in cooperation with protrusions 14. In FIG. 5c, the capsule holder 10 is not in a stable position, and can be moved along the guiding rail 21. The height of the rubber retainer 22 determines the distance between lateral edge 15 and guiding rail 21. The rubber retainer can also serve to avoid any damage to capsule holder 10 or housing 20, when the capsule holder 10 is moved in a sliding manner very often. When the protrusion 14 aligns with the rubber retainer 22 when moving the capsule holder 10 (arrow) along the guiding rails 21, the rubber retainer will be resiliently compressed, until a situation as shown in FIG. 5d is obtained. The rubber retainer 22 reforms to its original shape before the compression, and receives the protrusion 14 inside of its aperture. Now a force greater than a predetermined threshold is required to move the capsule holder 10 any further in or out of the housing (left and right in FIG. 5b). Again the predetermined threshold should fulfill the requirements mentioned above. Thus, the position of the capsule holder 10 in the housing 20 is stable. Due to the elasticity of the rubber retainer, the capsule holder 10 is held flexibly.

Figure 5F:
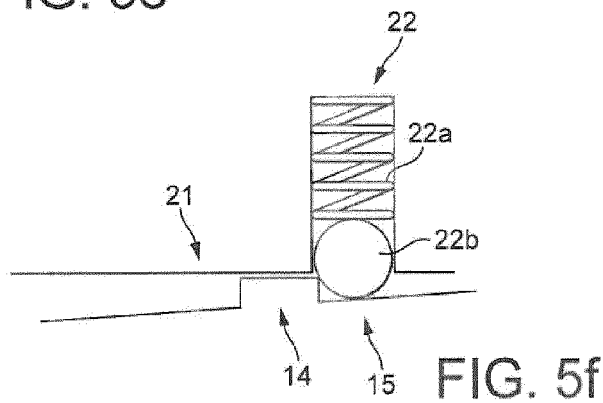
Figure 5G:
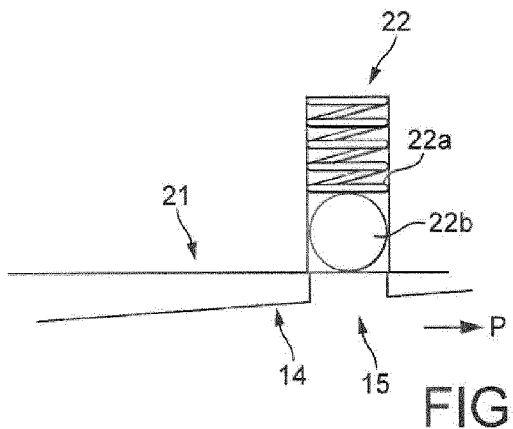
Figure 5H:
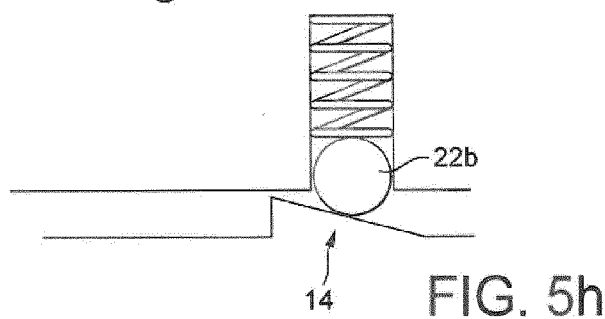

FIGS. 5e to 5g illustrate an variant in which the stopping member 22 is also a ball plunger in the guiding rail 21 of the housing and cooperating with the lateral edge 15 of the capsule holder. In this mode, the engaging members are formed (on each edge 15 of the capsule holder) by a single protrusion which stops the capsule holder by abutment of the ball 22b in extended position on the transversal surface of the protrusion 14. This defined capsule loading position is thus illustrated on FIG. 5f. The disengagement of the capsule holder from the housing is obtained by pulling the capsule holder in direction "P" which causes the ball 22b to compress the spring 22a in the cylinder of the ball plunger. Of course, the protrusion 14 can take the form of a ramp as illustrated in FIG. 5h to provide a more progressive resistance and better feeling during handling.

The engaging members 14 are provided on the capsule holder 10 at a position, so that in combination with the position of the stopping members 22 on the guiding rails 21, the capsule holder 10 can take a stable defined loading position, partially engaged with the housing 20, in which a recess 11 shown in FIG. 3a is located completely outside of the housing 20. When the recess 11 is located outside of the housing 20 a capsule 30 can be easily reloaded. Since the engaging members 14 and the stopping members 22 hold the capsule holder 10 in a stable defined loading position in this configuration, reloading of the capsule 30 requires only one hand of the user, since he needs not hold the capsule holder 10.

On the guiding rails 21 of the housing 20 additionally ramps 23 can be provided, preferably one on each side of the opening 24 of the housing 20. The ramps are preferably positioned directly adjacent to the stopping members 22 and are preferably positioned on the side of the stopping members 22, which is further inside of the housing 20. The ramps 23 preferably increase in thickness in one direction, preferably in the direction towards the stopping members 22, and provide a frictional engagement for the engaging members 14 of the capsule holder 10, particularly for protrusions. The lateral edges 15 or protrusions will rub against the ramps 23, when the capsule holder 10 is moved. The strongest frictional engagement takes place, where the ramps 23 have their largest thickness. Then the stable loading position, in which the recess 11 is located outside of the housing 20, can be further stabilized by means of the frictional force resisting movement of the capsule holder 10.

In the stable defined loading position shown in FIG. 4, the capsule holder 10 is preferably slanted against the housing 20. FIG. 4 shows how the capsule holder 10 is inclined by an angle A in respect to the housing 20 (i.e. the lateral edges 15 form an angle A with the guiding rails 21), wherein the angle is preferably in a range of 150° to 175°, more preferably 160° to 165°. The inclined position makes it easier to reload a capsule 30, since the recess 11 is turned towards the user. In said stable defined loading position, the partial engagement of the capsule holder 10 in the housing 20 is resilient, so that damage to the capsule holder 10 or the housing 20 can be prevented, in particular when accidentally a force is applied to the capsule holder 10 in the stable position, e.g. a force, which is not directed in direction of the guiding rails 21. The resiliency is provided by the resilient stopping members 22 and/or engaging members 14. As explained above, the spring of a ball plunger 21 is resilient, and a rubber retainer is resilient due to its elasticity.

By overcoming the spring force of the ball plunger 22 or the elasticity force of the rubber retainer 22, respectively, or in general the force, which stabilizes the capsule holder in the loading position, the capsule holder 10 can be completely removed from the housing 20. Thereby, the capsule holder 10 and the housing 20 are not damaged. The applied force only releases the stable loading position of the capsule holder 10. Once the capsule holder 10 has been taken out of the housing 20, it can be conveniently cleaned, repaired and/or replaced. For a reinsertion into the housing 20, the same resisting force of the engaging members 14 and stopping members 22, respectively, has to be overcome. As explained above it is not necessary to remove the capsule holder 10 from the housing 20 completely, in order to reload a capsule 30, since in the stable loading position defined by the engaging members 14 and the stopping members 22, the recess 11 is fully located outside of the housing 20.

As shown in FIGS. 3a and 4 the capsule holder 10 further comprises notches 13. The notches 13 are little recesses, which directly border the recess 11, in which the capsule 30 is placed. The notches 13 are preferably located on opposite sides of the approximately round contour of the recess 11. Note that the contour of the recess 11 can also be asymmetric, i.e. not symmetric in rotation when viewed from above, and preferably matches the contour of an inlet face of a capsule 30. The notches 13 serve to facilitate the removal of a capsule 30, which is typically fully inserted into the recess 11, so that its top surface lies in the same plane as the top surface of the capsule holder 10. The user can insert at least one finger into each of the notches 13 to remove the capsule 30 from the recess 11. The shape of the notches 13 is not intended to limit the application. Many shapes can be used, e.g. round, oval, rectangular, squared, triangle etc.

Important is only, that one finger of the user can comfortably be inserted into each of the notches 13.

The capsule holder 10 as shown in FIG. 3a or 4, further has a handle piece 17, which is preferably located on the capsule holder's rear edge. The rear edge of the capsule holder 10 is the edge, which is not partially engaged in the housing in the stable loading position. By means of the handle piece 17 the capsule holder 10 can be grabbed by a user, and can be removed completely from the housing 20. The capsule holder 10 can be inserted into the housing 20, until the handle piece 17 abuts against the housing 20, as is the case in FIGS. 5a and 5b. When the handle piece 17 abuts against the housing 20, the loaded position of the capsule holder in the housing 20 is reached. In this loaded position the capsule holder 10 is fully engaged in the housing. The loaded position is stabilized against movement in one direction by the abutting handle piece 17. In order to stabilize the capsule holder 10 also against the outward movement in this position, the capsule holder 10 can for example comprise another pair of protrusions or recesses on the lateral edges 15, which could engage with the stopping means 22. The capsule holder 10 can also comprise any other means to provide the stable position in the housing 20, when the capsule holder 10 is fully inserted. For example, the capsule holder 10 can comprise means on the handle piece 17, which connect with means on the outside of the housing 20, so that a force has to be overcome, if the capsule holder 10 is to pulled out again. These means can comprise magnets attracting each other, a snap in lock, or a lock that is manually operated by the user to fix the capsule holder 10. Note, however, that the capsule holder 10 is in any case stabilized during operation of the machine 1 by the injection plate 4a pressing onto the capsule 30, and the liquid needle 4b penetrating the capsule 30. The loaded position, in which the capsule 30 is positioned for liquid supply needs not necessarily be the position, in which a handle piece 17 abuts against the housing 20, but can be any other well defined loaded position.

Figure 7A:
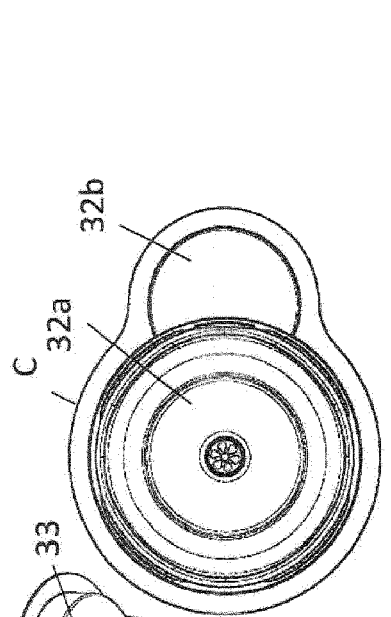
FIGS. 7a to 7d show an example of a capsule not covered by the present invention.
Figure 7B:
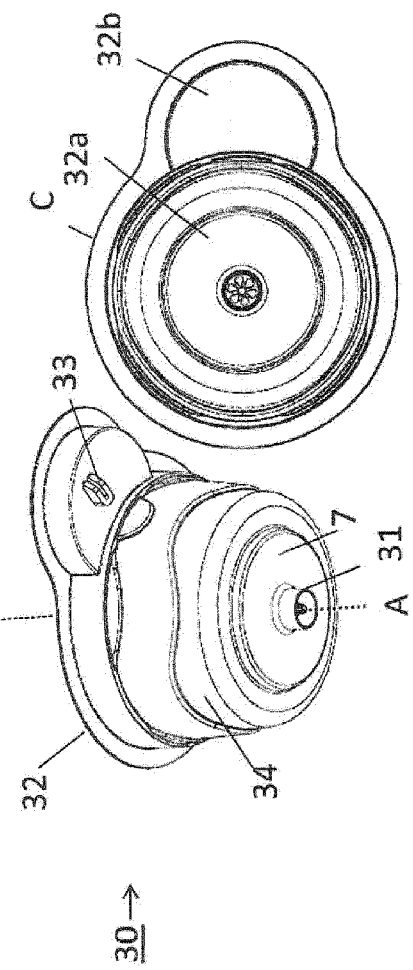
Figure 7C:
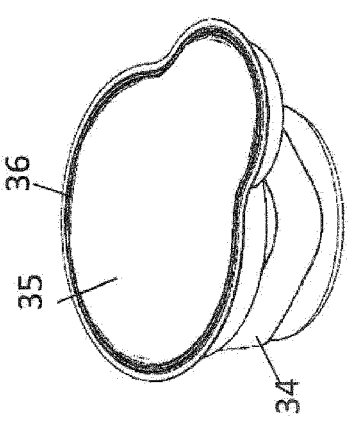
Figure 7D:
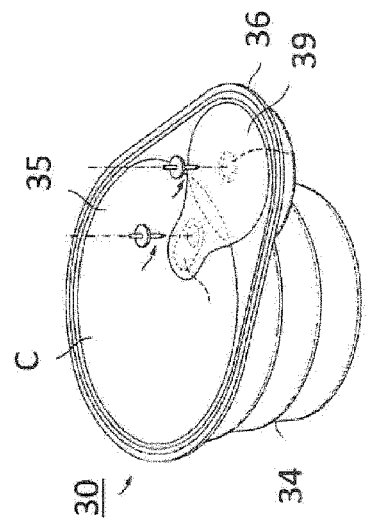

An example of a capsule 30, which is designed for insertion into a beverage production machine 1, respectively a capsule holder 10, is illustrated in connection with FIGS. 7a-7d. However, the present invention is not limited to any type, size, shape or configuration of the capsule 30. In the example, the capsule 30 generally comprises a cup-shaped base body 32 for receiving ingredients. As shown in FIGS. 7a and 7b the cup-shaped base body 32 has a bottom 37, a side wall 34 and an inlet face C, which has preferably a contour, which is not symmetric in rotation, when viewed from the top of the capsule 30 along a longitudinal axis A of the capsule 20. The volume of the cup-shaped base body 32 may vary depending on the volume of liquid to be injected into the capsule 30. In general, a large volume is preferred for large volume of liquid so that the cup-shaped base body 32 serves as a mixing bowl for the ingredients and liquid to form the composition. The inlet face C can for example presents a bulge section 32b extending from an essentially circular section 32a, and can be closed by a liquid impermeable foil member 35, which can be sealed to an upper flange like rim 36 of the inlet face C. The foil member 35 may be simply liquid impervious or, most preferably, liquid and gas impervious. In particular, the membrane can be a multilayer comprising a gas barrier such as EVOH and/or aluminum. The top membrane is made of a puncturable material such as thin polymer and/or aluminum to enable liquid to be supplied by means of the liquid needle 4b, on one hand, and optionally gas, e.g. air, to be supplied to the capsule 30 by means of the air needle 4c described above, on the other hand.

The bottom 37 of the cup-shaped base body 32 comprises at least one outlet 31 intended for the release of the beverage from the capsule 30. The outlets 31 may comprise one or several openings for streaming of the liquid composition towards a receptacle such as a baby bottle, glass or cup. The outlets 31 may extend from the bottom 37 of the cup-shaped base body 32 by a short duct for directing the flow of liquid and reducing side projections of liquid, which could contaminate the surroundings of the receptacle. The inlet face C of the capsule 30 may extend as mentioned above in a bulge section 32b, which preferably is adapted to receive a fluid inlet unit such as a filter 39 for filtering liquid supplied to the capsule 30. The term "bulge" does not refer to a specific shape of the section but only indicate a protrusion or convex section extending from the main circular section. The term "circular" is also not restricted to a pure circle but encompass slight shape variations such as a corrugated closed rounded contour. The capsule 30 can have an optically readable code (not shown) on the side wall 34 of the capsule 30.

The main advantages of the present invention are that a capsule holder 10 can be inserted into the housing 20 of a beverage production machine 1, and can take at least two defined positions in engagement with the housing 20, and can be removed by hand from the housing 20 without being damaged or requiring specific tools. One defined position is a loaded position, where the capsule holder 10 is preferably completely inserted into the housing 20, and the recess 11 is positioned inside the housing 20, so that a capsule 30 in the recess 11 is positioned appropriately for liquid supply. This means that the liquid injection assembly 4a, 4b is able to penetrate the capsule 30, and is able to inject liquid into the capsule 30. Preferably, the liquid injection only works, if the positioning is correct.

The capsule holder 10 can take a second stable defined loading position in the housing 20, in which it is only partially engaged, i.e. is partially inserted into the housing 20. The second stable defined loading position is such that the recess 11 is located completely outside of the housing 20, i.e. with its full contour, or at least so that a capsule 30 can be reloaded without hindrance. The position is stable so that only a predetermined force can move the capsule holder 10 from this position to the loaded position or to the removal position. The capsule holder 10 can be resiliently removed from the housing 20 for cleaning, repairing and/or replacing purposes. The capsule holder 10 is removable in a way that it is not damaged and does not require specific tools, and that also the housing 20 or other parts of the beverage production machine 1 are not damaged or dismantled.

FIGS. 8a to 8c represent another mode of the invention. The capsule holder 100 comprises stopping members 140 forming a pair of transversally and upwardly raising indentations 141, 142 on the front of the capsule holder. The indentations may be separated by a frontal cutout 143. The housing 200 of the machine comprises engaging members 220 which are made of a pair of transversally and downwardly raising indentations 221, 222 at the entry of the housing. The upward indentations 141, 142 are designed to engage against the downward indentations 221, 222 when the capsule holder is engaged by its lateral edges 150 in the guiding rails 210 of the housing in the capsule loading position illustrated on FIG. 8e. In this position, the capsule holder is preferably slanted (angle A between the median longitudinal plane of the edges of the capsule holder and the median longitudinal plane of the guiding edges of the housing), as a result of its weight and the vertical play between the lateral edges 150 and the guiding rails, to ensure the hooking of stopping members 140 by the engaging members 220. In the position of FIG. 8e, the recess 11 of the capsule holder is sufficiently uncovered and in stopped position to allow the insertion of a capsule 30 in the recess.

When the capsule holder is pushed linearly along the guiding plane B, the capsule holder reaches the beverage production position as illustrated in FIG. 8f. Such position is referenced, for instance, by the handle 17 coming in abutment against the front entry wall 211 of the housing. To remove the capsule holder from the housing, the capsule holder is moved upwards, more particularly, is rocked around a free pivot axis constituted by the engaging members 220 as illustrated by FIG. 8g. An undercut 224 is preferably provided in the guiding rails below the engaging members 220 to enable the rotation of the front portion of the side edges of the capsule holder during such movement. Additionally or alternatively, the front lower edge of the capsule holder 146 can be made convex or biased to facilitate the disengagement of the capsule holder from the housing.

FIG. 8d just shows a variant of the capsule holder in which the stopping members are formed by two lateral indentations 143, 144 one each side of the front edge 145 which are obtained by two lateral cutouts 146, 147 running along the lateral edges 150 of the capsule holder.

The invention claimed is:

1. A production machine for beverages and liquid comestibles, the machine comprising:
   a housing;
   a capsule holder designed for insertion into the housing, wherein the capsule holder comprises a capsule receiving member designed for receiving a capsule containing ingredients for a beverage;
   a liquid injection assembly provided in the housing for supplying liquid to the capsule received in the capsule holder; the capsule holder and the machine are designed such that the capsule holder can be transferred manually, via a relative movement of the capsule holder and the housing of the machine, at least between:
   a first capsule loaded position in which the capsule received in the capsule holder is positioned ready for being engaged by the liquid injection assembly,
   a second capsule loading position in which the capsule receiving member is exposed outside of the housing for the loading of the capsule therein,
   wherein complementary stopping members of the capsule holder and the housing are provided and configured to automatically engage each other to stop the capsule holder in the second capsule loading position as the capsule holder is moved from the first capsule loaded position;
   the housing comprises parallel guiding rails for guiding the capsule holder into the housing by receiving opposite lateral edges of the capsule holder;
   the stopping members are provided on each of the guiding rails of the housing;
   engaging members are provided on each of the lateral edges of the capsule holder, and the engaging members are adapted to engage with the stopping members to define the second capsule loading position of the capsule holder in the housing;
   the lateral edges of the capsule holder in the second capsule loading position are slanted relative to the guiding rails by an angle in a range of 150 to 175 degrees such that the capsule holder is inclined relative to an insertion direction; and
   the stopping members are further configured to be released to move the capsule holder manually in at least one direction causing the capsule holder to be removed from the housing and configured to be released by applying a pulling force of between 4 and 25 Newton on the capsule holder.

2. The beverage production machine according to claim 1, wherein the stopping members are configured to be released by applying a movement on the capsule holder comprising an upward rocking movement.

3. The beverage production machine according to claim 1, wherein the stopping members are configured to provide a resilient engagement of the capsule holder in the housing.

4. The beverage production machine according to claim 1, wherein in the second capsule loading position, the pulling force on the capsule holder above a predetermined threshold value is required to remove the capsule holder from the housing.

5. The beverage production machine according to claim 1, wherein the stopping members are ball plungers or rubber retainers and the engaging members are transversal protrusions or recesses.

6. The beverage production machine according to claim 5, wherein the ball plungers have a substantially cylindrical shape, and have an axial bore into which each a spring and a ball are inserted, wherein the ball is adapted to exit the axial bore on one side of the ball plungers partially, and wherein each of the recess is formed according to the shape of the corresponding ball.

7. The beverage production machine according to claim 1, wherein a ramp is provided on each of the guiding rails, wherein the ramp is bordering the stopping members to the inside of the housing, for providing a frictional engagement with the engaging members of the capsule holder in the second capsule loading position.

8. The beverage production machine according to claim 1 wherein the stopping members are a pair of transversally and upwardly raising indentations on the front of the capsule holder; and the engaging members are a pair of transversally and downwardly raising indentations at the entry of the housing.

9. The beverage production machine according to claim 1, wherein the capsule holder comprises a recess in which the capsule is received, and the capsule holder further comprises a pair of notches, wherein the notches border the upper edge of the recess.

10. The beverage production machine according to claim 1, wherein the capsule holder comprises a handle piece on a rear edge of the capsule holder, wherein the rear edge is defined in respect to the insertion direction of the capsule holder.

11. The beverage production machine according to claim 10, wherein the handle piece abuts with the housing in the first beverage production position.

12. The beverage production machine according to claim 1, wherein the stopping members are transversal protrusions or recesses and the engaging members are ball plungers or rubber retainers.

13. The beverage production machine according to claim 1, wherein engagement of the stopping members forms a pivot such that the capsule holder is pivoted upward for disengagement from the housing.

* * * * *